United States Patent [19]
Arthur et al.

[11] 3,892,971
[45] July 1, 1975

[54] RADIATION DETECTOR SYSTEM USING AN INORGANIC SCINTILLATOR CRYSTAL DETECTOR WITH AN OPTICAL FILTER FOR AERIAL DOSEMETRY

[75] Inventors: William E. Arthur, Torrance; Terry E. Carrell, Los Angeles, both of Calif.; Willard Crego, Hudson, Ohio

[73] Assignee: The United States of America as represented by the Secretary of the Army, Washington, D.C.

[22] Filed: Mar. 22, 1974

[21] Appl. No.: 453,905

[52] U.S. Cl. ............... 250/361; 250/368; 250/510
[51] Int. Cl. .............................................. G01t 1/20
[58] Field of Search .......... 250/361, 362, 363, 366, 250/368, 369, 510

[56] References Cited
UNITED STATES PATENTS

| | | | |
|---|---|---|---|
| 3,048,698 | 8/1962 | Carlson | 250/367 X |
| 3,814,938 | 6/1974 | Martone et al. | 250/366 |

Primary Examiner—James W. Lawrence
Assistant Examiner—Davis L. Willis
Attorney, Agent, or Firm—Max L. Harwell; Nathan Edelberg; Robert P. Gibson

[57] ABSTRACT

A radiation detector system used in aerial dosimetry in which an inorganic scintillation crystal detector and spectral filter are coupled to a photomultiplier tube and the requisite electronic circuits. The crystal detector is pointed toward an area to be monitored for X-ray or gamma ray and the resulting optical radiation therefrom is applied to the photomultiplier tube for converting to an electrical output therefrom which is monitored to indicate the radiation dosage.

5 Claims, 1 Drawing Figure

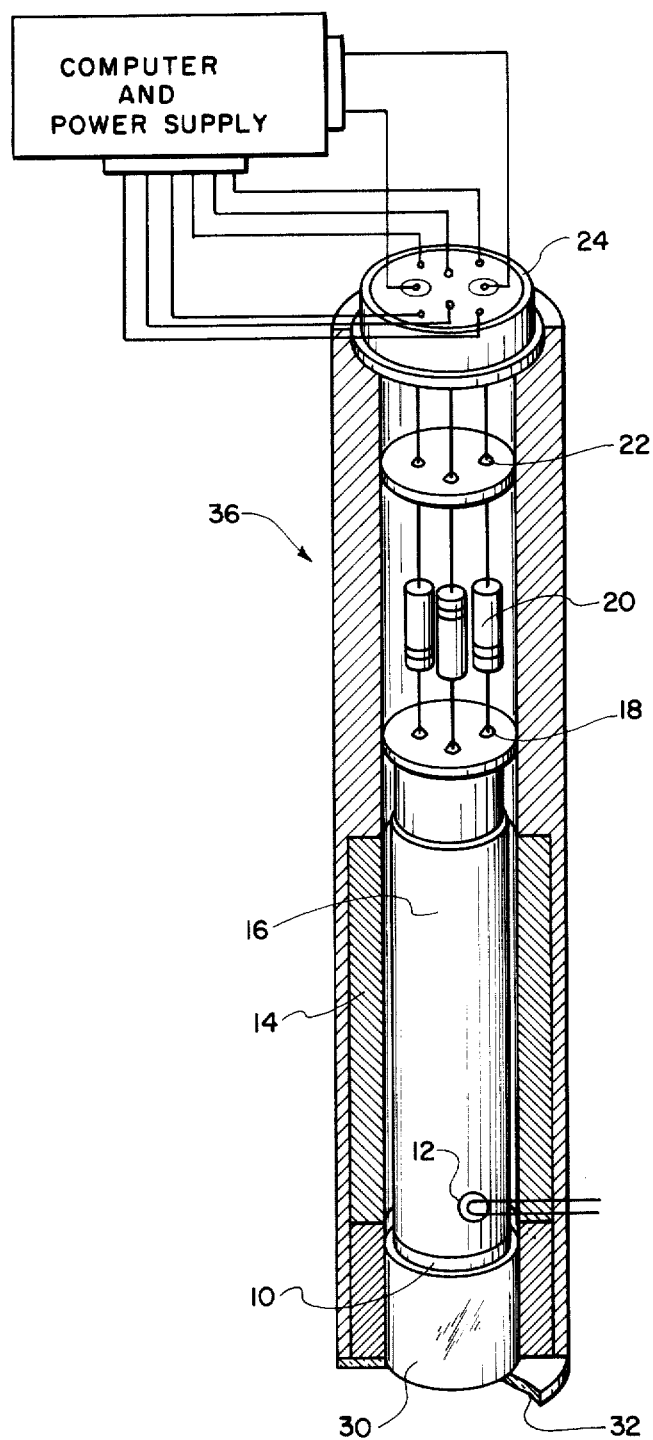

3,892,971

RADIATION DETECTOR SYSTEM USING AN INORGANIC SCINTILLATOR CRYSTAL DETECTOR WITH AN OPTICAL FILTER FOR AERIAL DOSEMETRY

BACKGROUND OF INVENTION

This invention is in the field of inorganic scintillation crystal detectors used in association with a spectral filter for passing the initial radiation and reducing the residual radiation.

In the use of dosimeters mounted in an aircraft for monitoring radiation on or near the ground, the greatest sensitivity possible is required. Organic scintillators have been used but their sensitivity is lacking for use in aerial dosimetry.

SUMMARY OF THE INVENTION

This invention comprises an inorganic scintillator crystal and an optical filter wherein the crystal has light output that persists after the exciting radiation has been removed with the optical filter transmitting only the initial radiation. When the filter is positioned between the scintillator and photomultiplier tube, the persistence of the inorganic scintillator is effectively eliminated and a more rapid response of the initially detected radiation provides more effective dosimetry measurements. A photomultiplier tube detects the optical radiation from the scintillator crystal that passes through the filter and coverts this optical radiation to electrical signals which are measured by a computer.

DETAILED DESCRIPTION OF THE DRAWING

The FIGURE shows a cutaway view of the improved detector module of the present invention. An inorganic scintillator crystal 30 is positioned at the input end of a ruggedized detector container 36. An end window 32 encloses crystal 30 at the input end of container 36. Crystal 30 may be made of some convenient inorganic scintillator material such as mixtures of sodium, iodine, and thallium; cesium, iodine, and thallium; cesium, iodine, and sodium; or calcium, fluoride, and europium. These scintillator crystals have excited energy levels with long decay times. When these levels become populated detector placed in a high intensity radiation field), it becomes impossible to accurately measure large rapid changes in the input dose rate due to the time lag required for this decay. The photons emitted during this residual decay have energies that are different from energies of the initial radiation. Therefore, the residual decay energies cause emission of different colors of light. A narrow bandpass optical filter 10, that transmits only the initial radiation, is placed between crystal 30 and the input to a photomultiplier tube 16. Container 36 has a lead shield 14 on the inside thereof that surrounds and protects the photomultiplier tube from radiation.

A voltage divider chain, represented by resistors 20, is used in applying various voltages to the photomultiplier and in processing the output from the photomultiplier tube prior to application to a monitor. A high voltage power supply in the computer and source supply block provides about 900 volts that is adjustable by resistors 20 for proper voltage application to the photomultiplier tube 16, The monitor is contemplated as being a computer having electrical signals, representing a built in radiation level, programmed therein for comparison with the actual radiation level detected by the present detector. Numerals 18 and 22 represent, respectively connections between the voltage divider 20 and tube 16 and between an electrical connector 24 and the voltage divider 20. Connector 24 has connections therein for fitting with electrical leads connected to the computer and the high voltage power supply. A calibration lamp 12 is used for calibrating the photomultiplier tube 16. The lamp is shown symbolically with electrical leads feeding back out container 36 wall, but the lamp may preferably be mounted on a connector assembly that meshes with the container 36 wall for ease of replacement. The connector assembly could have leads to a temperature compensated current regulated power supply having potentiometric controls and the lamp may have a mechanical aperture with a wide adjustment range wherein the combination of potentiometric controls and mechanical aperture provide the fine control of light output for calibration purposes.

As stated above, the present detector is a part of an overall radiation detector system. This system further comprises a computer power supply, a recorder, and interconnecting cables. Typical material used in the inorganic scintillator 30 are NaI(T1), CsI(T1), CsI(Na), and CaF(Eu) crystals. The spectral filter used in association with any of these crystals 30 is a blue filter, such as Wratten Type 34A. An example of a combination of a CaF(Eu) crystal 30 used with a Wratten Type 34A filter 12 provides a dynamic range of 0.003 to 30 roentgens per hour for gamma-ray dose rates. The net result with this combination is a background of approximately 0.0015 roetgen per hour after exposure in a field of 30 roentgens per hour. This background persists for approximately 2 to 3 seconds. It may be possible to improve this slightly by the use of some other filter that is similar to the Wratten Type 34A but having a slightly different spectral transmission factor.

The photomultiplier tube 16 may be a ruggedized version of the RCA model 4516 selected for low dark current and uniform gain. The signal is extracted from the anode which will provide stable operation over a wide range of applied voltages near a nominal operating range of 900 volt direct current. End window 32 may have different thicknesses to permit accurate calibration with other rays, such as bets rays or to match the detector to a selected comparison valve within the computer. The end window 32 and scintillator crystal 30 may be potted to container 36 to prevent the entrance of moisture, salt, fog, etc. while maintaining the electrical bonding requirements.

While only one embodiment has been shown and described, various modifications and substitution may be made without deviating from the scope and spirit of this invention. Thus, this invention is described by way of illustration rather than limitation and accordingly it is understood that this invention is limited only by the appended claims.

We claim:

1. A radiation detection system for aerial dosimetry comprising:
    an elongated cylindrical detector container having a radiation transparent end window at an input end and an electrical connector at an output end;
    a solid inorganic scintillator crystal positioned adjacent said end window wherein said scintillator crystal and said end window are potted to said detector container;

a blue optical filter contiguous with said solid inorganic scintillator crystal; and a photomultiplier tube surrounded by a lead shield within said detector container and having an input end positioned adjacent said blue optical filter and an output end having electrical leads connected through said electrical connector to dosimetry electronics inside a computer in which radiation emitted from a monitored area near the ground passes through said end window and is incident on said solid inorganic scintillator crystal resulting in residual optical radiation therefrom being filtered and only the initial radiation therefrom being transmitted by said blue filter to said input of the photomultiplier tube for converting to an electrical output signal monitored by said dosimetry electronics.

2. A radiation detector system as set forth in claim 1 wherein said inorganic scintillator crystal is made of a mixture of sodium, iodine, and thallium.

3. A radiation detector system as set forth in claim 1 wherein said inorganic scintillator crystal is made of a mixture of cesium, iodine and thallium.

4. A radiation detector system as set forth in claim 1 wherein said inorganic scintillator crystal is made of a mixture of cesium, iodine, and sodium.

5. A radiation detector system as set forth in claim 1 wherein said inorganic scintillator crystal is made of a mixture of calcium, fluoride, and europium.

* * * * *